(12) United States Patent
Karasawa

(10) Patent No.: US 11,054,727 B2
(45) Date of Patent: Jul. 6, 2021

(54) PROJECTOR AND PROJECTION SYSTEM

(71) Applicant: SEIKO EPSON CORPORATION, Tokyo (JP)

(72) Inventor: Joji Karasawa, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 93 days.

(21) Appl. No.: 16/517,722

(22) Filed: Jul. 22, 2019

(65) Prior Publication Data

US 2020/0026166 A1 Jan. 23, 2020

(30) Foreign Application Priority Data

Jul. 23, 2018 (JP) .............................. JP2018-137458

(51) Int. Cl.
*G03B 21/14* (2006.01)
*G03B 21/00* (2006.01)

(52) U.S. Cl.
CPC ......... *G03B 21/145* (2013.01); *G03B 21/005* (2013.01); *G03B 21/142* (2013.01)

(58) Field of Classification Search
None
See application file for complete search history.

(56) References Cited

U.S. PATENT DOCUMENTS

| 2002/0024612 | A1 | 2/2002 | Gyoten | |
|---|---|---|---|---|
| 2010/0128228 | A1* | 5/2010 | Matsuo | G03B 21/30 353/34 |
| 2015/0331302 | A1* | 11/2015 | Watanuki | G03B 21/147 345/647 |
| 2016/0011495 | A1* | 1/2016 | Takagi | G03B 21/145 353/119 |
| 2018/0267685 | A1* | 9/2018 | Zhang | G06F 3/041 |

FOREIGN PATENT DOCUMENTS

| JP | 2002-077778 A | 3/2002 |
|---|---|---|
| JP | 2006-106078 A | 4/2006 |
| JP | 2010-164942 A | 7/2010 |
| JP | 2011-232474 A | 11/2011 |
| WO | 2014/171147 A1 | 10/2014 |

* cited by examiner

*Primary Examiner* — Michelle M Iacoletti
*Assistant Examiner* — Danell L Owens
(74) *Attorney, Agent, or Firm* — Oliff PLC

(57) ABSTRACT

A projector includes a first projection unit, a second projection unit, and a coupling part coupling the first projection unit and the second projection unit together. The first projection unit is configured to pivot about a first axis and projects the first image light in a direction intersecting the first axis. The second projection unit is configured to pivot about a second axis and projects the second image light in a direction intersecting the second axis. The coupling part couples the first projection unit and the second projection unit together in such a way that the first axis and the second axis are arranged on a coaxial line.

9 Claims, 12 Drawing Sheets

PROJECTOR AND PROJECTION SYSTEM

The present application is based on, and claims priority from JP Application Serial Number 2018-137458, filed Jul. 23, 2018, the disclosure of which is hereby incorporated by reference herein in its entirety.

BACKGROUND

1. Technical Field

The present disclosure relates to a projector and a projection system.

2. Related Art

According to the related art, a projector which projects projection light from a plurality of optical units is known. JP-A-2010-164942 is an example of the related art. The projector disclosed in JP-A-2010-164942 couples together projection light projected by the plurality of optical units and thus projects a wide image on a screen.

SUMMARY

An object of the disclosure is to provide a structure that makes the directions of projection of a plurality of projection light beams variable.

A projector according to an aspect of the disclosure includes: a first projection unit projecting first image light; a second projection unit projecting second image light; and a coupling part coupling the first projection unit and the second projection unit together. The first projection unit is configured to pivot about a first axis in relation to the second projection unit and projects the first image light in a direction intersecting the first axis. The second projection unit is configured to pivot about a second axis in relation to the first projection unit and projects the second image light in a direction intersecting the second axis. The coupling part couples the first projection unit and the second projection unit together in such a way that the first axis and the second axis are arranged on a coaxial line.

The projector may include a fixture fixing the first projection unit and the second projection unit coupled together by the coupling part, at an installation position.

In the projector, the first projection unit and the second projection unit may be configured to pivot independently of each other. The first projection unit may project the first image light in a direction orthogonal to the first axis. The second projection unit may project the second image light in a direction orthogonal to the second axis.

The projector may include a power supply unit which has a power reception unit receiving electric power supply and which supplies the electric power supplied to the power reception unit, to the first projection unit and the second projection unit.

In the projector, the first projection unit may project the first image light, based on image data inputted to an interface. The second projection unit may project the second image light, based on the image data inputted to the interface.

In the projector, the first projection unit may include a first angle detection unit detecting an angle around the first axis of the first projection unit, and a first image processing unit executing geometric correction based on the angle detected by the first angle detection unit.

In the projector, the first projection unit may include a first image detection unit detecting a first projection image formed by the first image light, a first optical adjustment unit adjusting at least one of zoom and focus of the first image light, and a first adjustment control unit causing the first optical adjustment unit to adjust at least one of zoom and focus of the first image light, based on a result of the detection by the first image detection unit.

In the projector, the first projection unit and the second projection unit coupled together by the coupling part may be coupled to a fixture provided at an installation position. The projector may include a support part coupled to the fixture which is fixed to a ceiling of an installation room where the projector is installed and which suspends and supports the projector.

In the projector, the first projection unit and the second projection unit may be configured to switch between and execute a split projection mode in which the first projection unit and the second projection unit respectively project a split image split from one image and an individual projection mode in which the first projection unit and the second projection unit respectively project an entirety of the image. The split projection mode and the individual projection mode may be switched according to a relative angle between the first projection unit and the second projection unit.

A projection system according to another aspect of the disclosure includes a first projection unit, a second projection unit, and a coupling part coupling the first projection unit and the second projection unit together. The first projection unit is configured to pivot about a first axis in relation to the second projection unit and projects first image light in a direction intersecting the first axis. The second projection unit is configured to pivot about a second axis in relation to the first projection unit and projects second image light in a direction intersecting the second axis. The coupling part couples the first projection unit and the second projection unit together in such a way that the first axis and the second axis are arranged on a coaxial line.

DESCRIPTION OF EXEMPLARY EMBODIMENTS

1. First Embodiment

1-1. Configuration and Installation State of Projector

Figure 1:
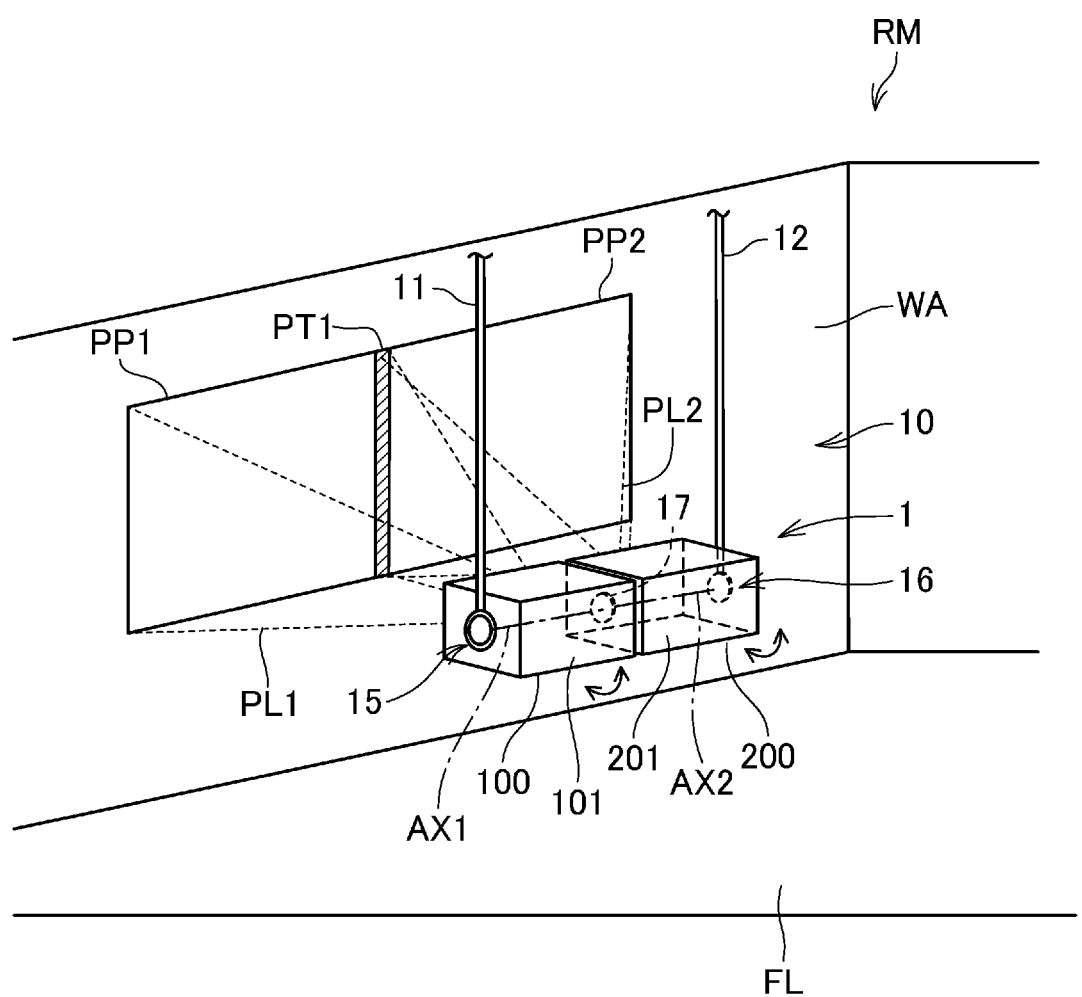
FIG. 1 is a perspective view of a projector according to a first embodiment.
Figure 2:
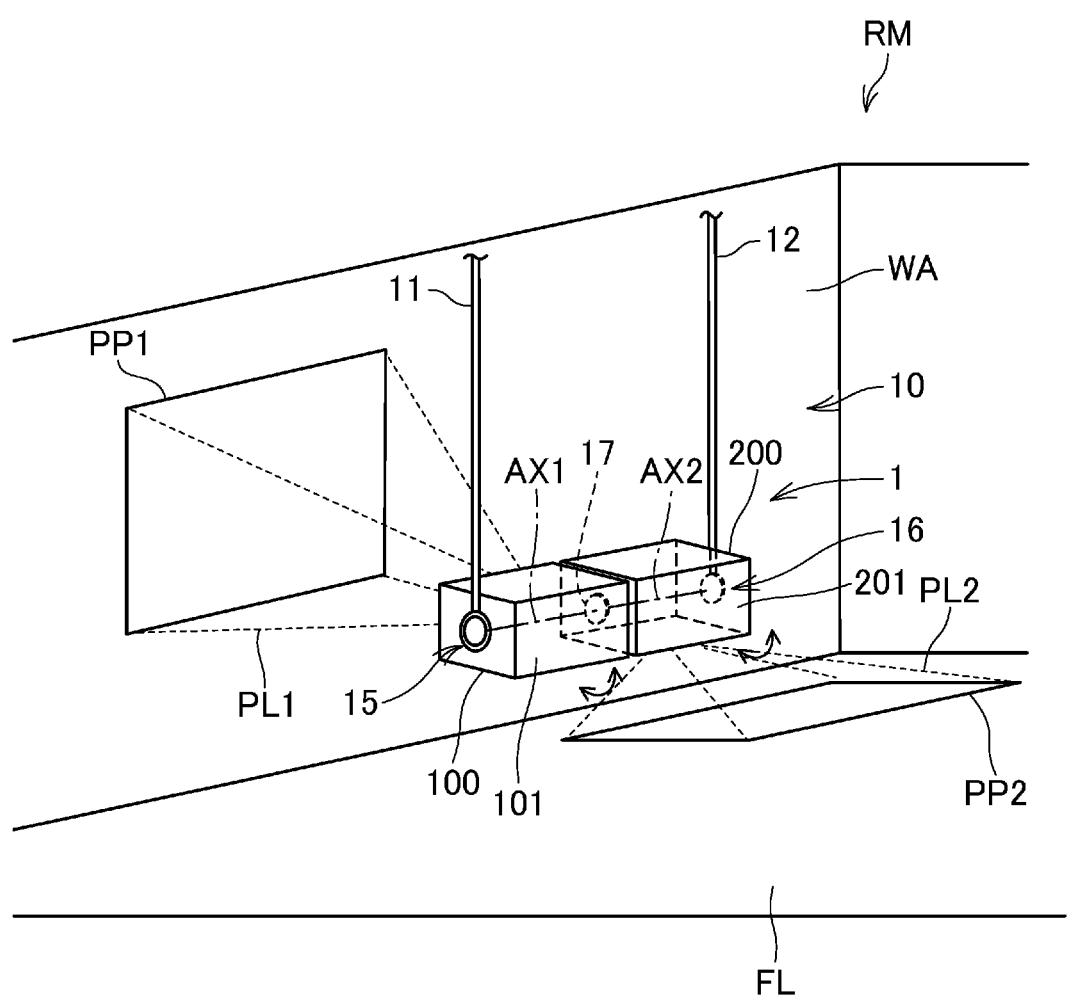
FIG. 2 is a perspective view of the projector.

FIGS. 1 and 2 are perspective view showing a schematic configuration of a projector 1 according to an embodiment to which the disclosure is applied.

The projector 1 is installed in an installation room RM. The installation room RM is equivalent to the installation position. The installation room RM has a wall surface WA, a floor surface FL, and a ceiling surface LF shown in FIG. 3 or the like. These surfaces are formed, for example, by planar surfaces. Suspension metal fixtures 11, 12 are fixed to the ceiling surface LF. The projector 1 is installed by being suspended by the suspension metal fixtures 11, 12. The projector 1, the suspension metal fixture 11, and the suspension metal fixture 12 together form a projection system 10. The suspension metal fixtures 11, 12 function as fixtures.

The projector 1 is made up of a plurality of projection units coupled together. In this embodiment, an example where the projector 1 has a first projection unit 100 and a second projection unit 200 is described.

The first projection unit 100 has a substantially box-shaped case 101 and functions as a projection device projecting first image light PL1. An image formed by the first image light PL1 projected by the first projection unit 100 is referred to as a projection image PP1. The second projection unit 200 has a substantially box-shaped case 201 and functions as a projection device projecting second image light PL2. An image formed by the second image light PL2 projected by the second projection unit 200 is referred to as a projection image PP2. It can be said that the projection image PP1 is equivalent to the first projection image and that the projection image PP2 is the second projection image.

FIG. 1 shows the state where the first projection unit 100 and the second projection unit 200 respectively project the first image light PL1 and the second image light PL2 toward the wall surface WA and thus form the projection image PP1 and the projection image PP2 on the wall surface WA.

The first projection unit 100 is configured to rotate in the directions indicated by an arrow in the illustration, about a first axis AX1. The second projection unit 200 is configured to rotate in the directions indicated by an arrow in the illustration, about a second axis AX2. The first projection unit 100 and the second projection unit 200 are configured to rotate independently of each other. For example, one can rotate only the first projection unit 100 or may rotate only the second projection unit 200.

The first projection unit 100 projects the first image light PL1 in a direction orthogonal to the first axis AX1. In other words, the optical axis of the first image light PL1 is orthogonal to the first axis AX1. The second projection unit 200 projects the second image light PL2 in a direction orthogonal to the second axis AX2. In other words, the optical axis of the second image light PL2 is orthogonal to the second axis AX2.

When the first projection unit 100 rotates, the direction of projection of the first image light PL1 changes. Therefore, the first projection unit 100 can project the first image light PL1 onto the floor surface FL and the ceiling surface LF. Similarly, when the second projection unit 200 rotates, the direction of projection of the second image light PL2 changes. Therefore, the second projection unit 200 can project the second image light PL2 onto the floor surface FL and the ceiling surface LF.

The first projection unit 100 and the second projection unit 200 are coupled together in such a way that the first axis AX1 and the second axis AX2 are arranged on a coaxial line. That is, as shown in FIG. 1, the first axis AX1 and the second axis AX2 extend in directions of linking the suspension metal fixture 11 and the suspension metal fixture 12.

FIG. 2 shows the state where the second projection unit 200 is rotated toward the floor surface FL. In the state of FIG. 2, the second projection unit 200 projects the second image light PL2 onto the floor surface FL. Therefore, the projection image PP2 is formed on the floor surface FL. The first projection unit 100 projects the first image light PL1 onto the wall surface WA. Therefore, the projection image PP1 is formed on the wall surface WA.

Figure 3:
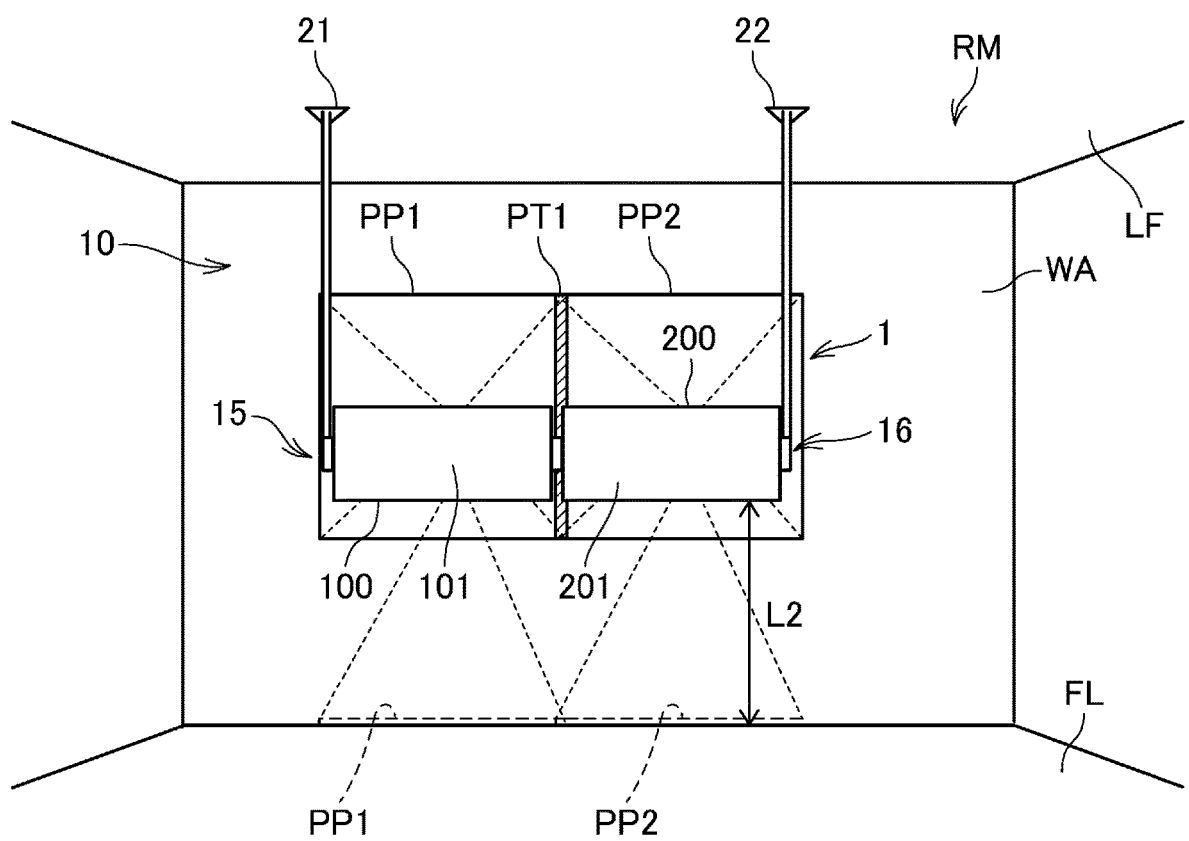
FIG. 3 is a rear view of the projector.
Figure 4:
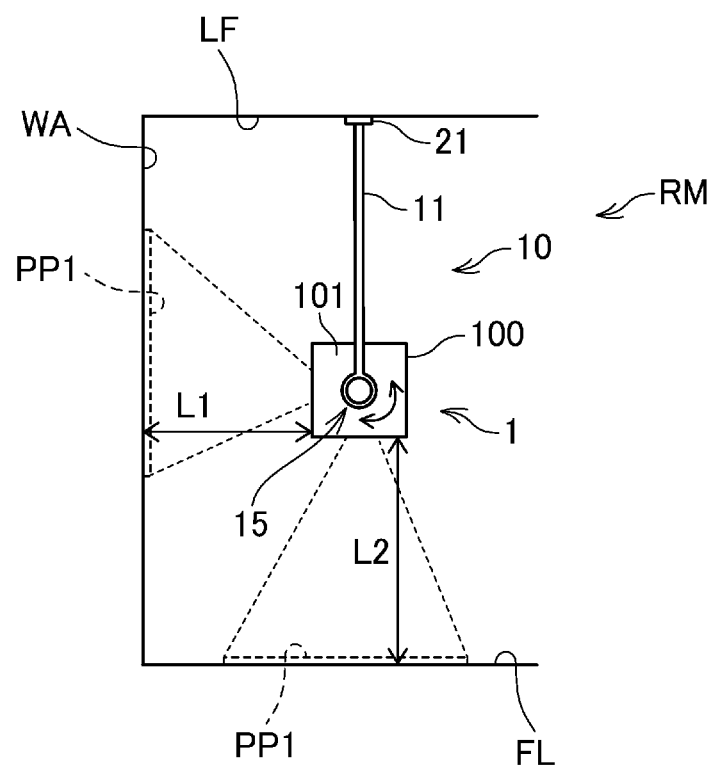
FIG. 4 is a side view of the projector.

FIG. 3 is a rear view of the projector 1. FIG. 4 is a side view of the projector 1.

As shown in these illustrations, the upper end of the suspension metal fixture 11 is fixed to the ceiling surface LF by a ceiling fixing member 21, and the upper end of the suspension metal fixture 12 is fixed to the ceiling surface LF by a ceiling fixing member 22. The suspension metal fixtures 11, 12 extend directly downward from the ceiling surface LF and coupled to the first projection unit 100 and the second projection unit 200.

The suspension metal fixture 11 and the case 101 are coupled together by a support part 15. The suspension metal fixture 12 and the case 201 are coupled together by a support part 16. The case 101 and the case 201 are coupled together by a coupling part 17. The support parts 15, 16 and the coupling part 17 are members respectively coupling two members together in a rotatable manner. Bearings or joints can be used for these parts.

In this embodiment, the first axis AX1 and the second axis AX2 are parallel to each of the wall surface WA and the floor surface FL. Therefore, the distance from the case 101 to the wall surface WA and the distance from the case 201 to the wall surface WA are substantially equal. Similarly, the distance from the case 101 to the floor surface FL and the distance from the case 201 to the floor surface FL are substantially equal.

A projection distance L1 to which the first projection unit 100 projects the first image light PL1 toward the wall surface WA, and a projection distance L2 to which the first projection unit 100 projects the first image light PL1 toward the floor surface FL, may be different from each other.

The first projection unit 100 has a mechanism to adjust the zoom magnification of the first image light PL1, as will be described later. Therefore, the size of the projection image PP1 projected on the wall surface WA by the first projection unit 100 and the size of the projection image PP1 projected on the floor surface FL by the first projection unit 100 are not necessarily coincident with each other. The same applies to the size of the projection image PP2 projected by the second projection unit 200.

1-2. Coupling Structure of Projection Units

Figure 5:
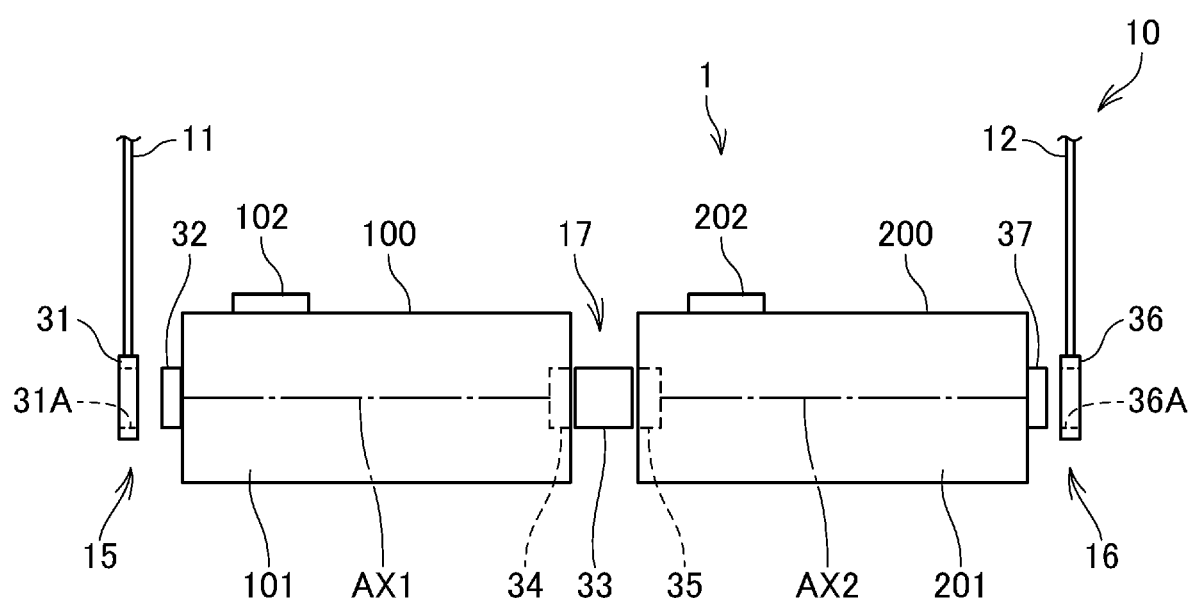
FIG. 5 is an exploded view of principal parts showing an example of a coupling structure between a first projection unit and a second projection unit.

FIG. 5 is an exploded view of principal parts showing an example of the coupling structure of the first projection unit 100 and the second projection unit 200.

In the example shown in FIG. 5, a support ring 31 is attached to the lower end of the suspension metal fixture 11. In the middle of the support ring 31, a circular attachment hole 31A is formed. At an end part of the case 101 along the first axis AX1, a cylindrical protrusion 32 is provided. The protrusion 32 fits in the attachment hole 31A, thus causing the case 101 to be supported by the suspension metal fixture 11 at the support part 15.

A support ring 36 is attached to the lower end of the suspension metal fixture 12. In the middle of the support ring 36, a circular attachment hole 36A is formed. At an end part of the case 201 along the second axis AX2, a cylindrical protrusion 37 is provided. The protrusion 37 fits in the attachment hole 36A, thus causing the case 201 to be supported by the suspension metal fixture 12 at the support part 16.

A bearing may be provided between the attachment hole 31A and the protrusion 32. Similarly, a bearing may be provided between the circular attachment hole 36A and the protrusion 37. The entirety of the support rings 31, 36 or the peripheral surface of the attachment holes 31A, 36A may be made of a highly slidable synthetic resin. For example, a polyacetal copolymer such as Duracon, or a fluorine resin such as Teflon can be used. Duracon and Teflon are registered trademarks.

The coupling part 17 can be made up of a coupling member 33 fitted in a recess 34 formed in the case 101 and a recess 35 formed in the case 201. Forming the recess 34 and the recess 35 as recesses with a circular cross-section and the coupling member 33 as a cylindrical member enables the case 101 and the case 201 to pivot in relation to each other via a sliding between the recesses 34, 35 and the coupling member 33.

The coupling member 33 may have a built-in bearing and may be fixed to each of the recess 34 and the recess 35.

In the configuration example of FIG. 5, the support part 15 and the support part 16 are equivalent to the support part. Particularly the protrusion 32 and the protrusion 37 are equivalent to the support part of the projector 1.

Figure 6:
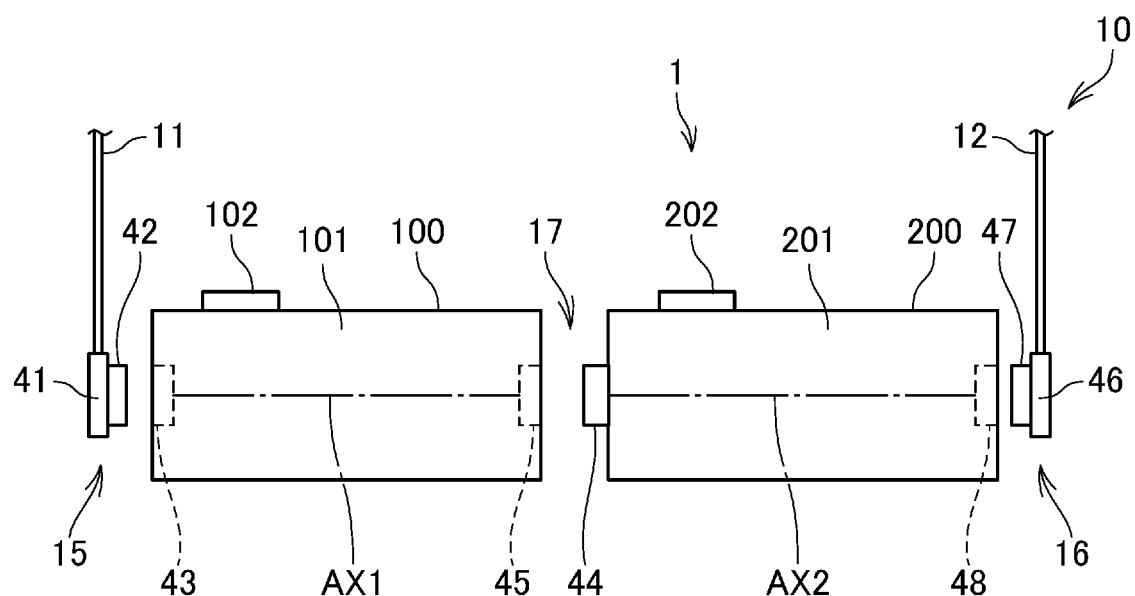
FIG. 6 is an exploded view of principal parts showing another example of the coupling structure between the first projection unit and the second projection unit.

FIG. 6 is an exploded view of principal parts showing another example of the coupling structure of the first projection unit 100 and the second projection unit 200.

In the example shown in FIG. 6, a support part 41 is attached to the lower end of the suspension metal fixture 11. The support part 41 is provided with a cylindrical protrusion 42 standing up toward the case 101. At an end part of the case 101 along the first axis AX1, a recess 43 configured to accommodate the protrusion 42 is formed. The recess 43 is a recess with a circular cross section, in which the protrusion 42 can be fitted. Fitting the protrusion 42 in the recess 43 allows the case 101 to be coupled in such a way as to be able to pivot in relation to the support part 15 via a sliding between the protrusion 42 and the recess 43.

Also, in the example of FIG. 6, a support part 46 is attached to the lower end of the suspension metal fixture 12. The support part 46 is provided with a cylindrical protrusion 47 standing up toward the case 201. At an end part of the case 201 along the second axis AX2, a recess 48 configured to accommodate the protrusion 47 is formed. The recess 48 is a recess with a circular cross section, in which the protrusion 47 can be fitted. Fitting the protrusion 47 in the recess 48 allows the case 201 to be coupled in such a way as to be able to pivot in relation to the support part 16 via a sliding between the protrusion 47 and the recess 48.

A bearing may be arranged between the protrusion 42 and the recess 43 and between the protrusion 47 and the recess 48. To increase slidability, the foregoing synthetic resin may be used for these parts.

The coupling part 17 can be made up of a protrusion 44 standing up on the case 201 and fitted in a recess 45 formed in the case 101. Forming the recess 45 as a recess with a circular cross-section and the protrusion 44 as a cylindrical member enables the case 101 and the case 201 to pivot in relation to each other via a sliding between the recess 45 and the protrusion 44.

In the configuration example shown in FIG. 6, the support part 15 and the support part 16 are equivalent to the support part. Particularly the recess 43 and the recess 48 are equivalent to the support part of the projector 1.

The configurations of the support parts 15, 16 and the coupling part 17 are not limited to the examples shown in FIGS. 5 and 6. These parts can be formed using a bearing, a joint, or another mechanical component.

1-3. Projection Mode

A projection mode in which the projector 1 projects the projection images PP1, PP2 will now be described.

In the state of FIG. 1, the projection image PP1 and the projection image PP2 are adjacent to each other. The projector 1 can connect the projection image PP1 and the projection image PP2 together to form one large projection image. In this case, an overlapping area PT1 where a part of the projection image PP1 and a part of the projection image PP2 overlap each other is formed. The same applies to where both of the first projection unit 100 and the second projection unit 200 project the first image light PL1 and the second image light PL2 toward the floor surface FL.

The size of the overlapping area PT1 is decided by the zoom magnification in each of the first projection unit 100 and the second projection unit 200, and the length of the projection distances L1, L2. The overlapping area PT1 can be formed, for example, by adjusting the zoom magnification in the first projection unit 100 and the second projection unit 200 according to the projection distance.

The projector 1 can switch between and execute a plurality of projection modes including a first projection mode and a second projection mode. The first projection mode is referred to as a split projection mode. The second projection mode is referred to as an individual projection mode. The split projection mode is a mode in which the first projection unit 100 and the second projection unit 200 project split images split from one image. The individual projection mode is a mode in which each of the first projection unit 100 and the second projection unit 200 projects one image.

The split projection mode is executed when the projection image PP1 and the projection image PP2 are projected in the same direction. For example, in the state shown in FIG. 1, the projection image PP1 and the projection image PP2 are projected next to each other on the wall surface WA. The projector 1 splits an image to be projected into two split images so that a combination of the projection image PP1 and the projection image PP2 forms one image. The projector 1 projects one split image from the first projection unit 100 and projects the other split image from the second projection unit 200. In this case, the split images are generated in such a way that the boundary between the two split images overlaps the overlapping area PT1. The projector 1 executes processing to make the boundary between the split images less visible by adjusting the luminance of the overlapping area PT1.

The individual projection mode can be executed even when the projection image PP1 and the projection image PP2 are not projected in the same direction. In this embodiment, the individual projection mode is executed when the projection image PP1 and the projection image PP2 are projected in different directions. For example, in the example of FIG. 2, the projection image PP1 is projected on the wall surface WA and the projection image PP2 is projected on the floor surface FL. In this state, the projector 1 projects one image from each of the first projection unit 100 and the second projection unit 200. The first projection unit 100 and the second projection unit 200 may project a common image or may project different images.

The projector 1 switches between the split projection mode and the individual projection mode, based on the relative angle between the case 101 and the case 201. The control of this switching will be described later.

1-4. Internal Structure of Projection Unit

Figure 7:
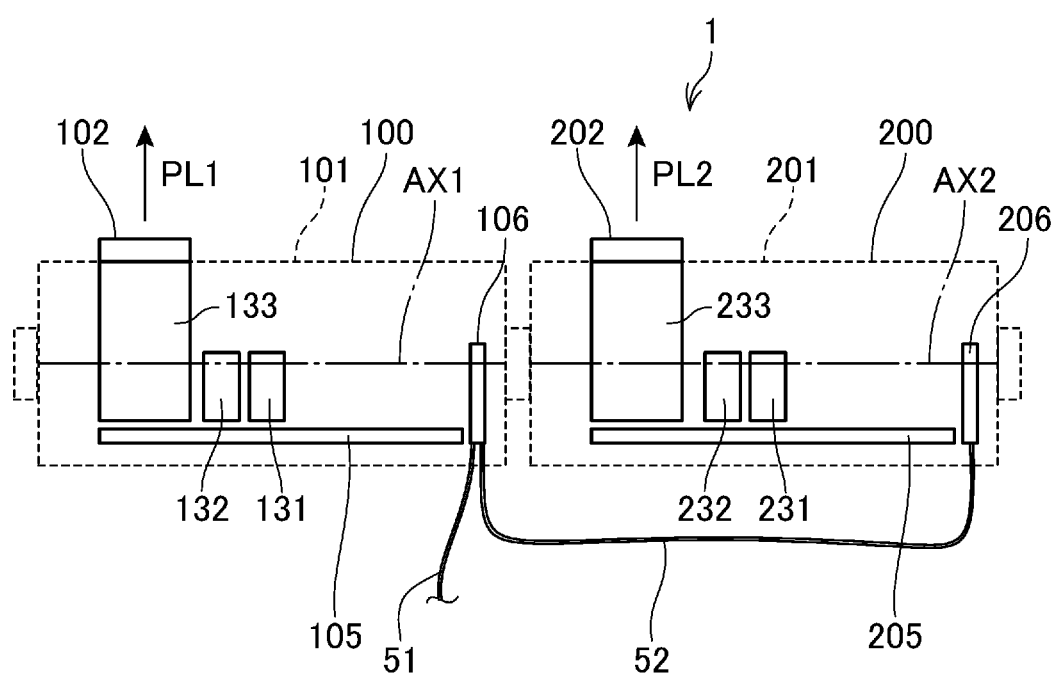
FIG. 7 shows an example of the internal configuration of the first projection unit and the second projection unit.

FIG. 7 shows an example of the internal configuration of the first projection unit 100 and the second projection unit 200.

The first projection unit 100 includes a projection unit 130 having a light source 131, a light modulation device 132, and an optical unit 133, and accommodated in the case 101, as will be described in detail later. In the projection unit 130, the light modulation device 132 modulates light emitted from the light source 131 and thus generates the first image light PL1. The projection unit 130 projects the first image light PL1 from a projection port 102 via the optical unit 133. The direction in which the first image light PL1 is projected is a direction orthogonal to the first axis AX1, as described above. The optical unit 133 has various optical components such as a lens group for zoom and focus adjustment of the first image light PL1, and a mirror and a prism for changing the direction of projection of the first image light PL1.

Inside the case 101, a control board 105 and an input/output board 106 are arranged. The control board 105 is a board where a processor 111 controlling the projection by the projection unit 130 or the like is installed. The input/output board 106 is a board where a circuit inputting and outputting image data and electric power is installed. A cable 51 for image data transmission and electric power supply is coupled to the input/output board 106 from outside the projector 1.

In the projector 1, the first projection unit 100 receives electric power supplied from outside the projector 1 and distributes the electric power from the first projection unit 100 to the second projection unit 200. Also, in the projector 1, the first projection unit 100 receives image data supplied from outside the projector 1. The first projection unit 100 transmits image data about the projection image PP2 projected by the second projection unit 200, from the first projection unit 100 to the second projection unit 200.

The second projection unit 200 includes a projection unit 230 having a light source 231, a light modulation device 232, and an optical unit 233, and accommodated in the case 201, as will be described in detail later. In the projection unit 230, the light modulation device 232 modulates light emitted from the light source 231 and thus generates the second image light PL2. The projection unit 230 projects the second image light PL2 from a projection port 202 via the optical unit 233. The direction in which the second image light PL2 is projected is a direction orthogonal to the second axis AX2, as described above. The optical unit 233 has various optical components such as a lens group for zoom and focus adjustment of the second image light PL2, and a mirror and a prism for changing the direction of projection of the second image light PL2.

Inside the case 201, a control board 205 and an input/output board 206 are arranged. The control board 205 is a board where a processor 211 controlling the projection by the projection unit 230 or the like is installed. The input/output board 206 is a board where a circuit inputting and outputting image data and electric power is installed. A cable 52 for image data transmission and electric power supply is coupled to the input/output board 206 from the input/output board 106 of the first projection unit 100.

This configuration does not need to lay a wiring to each of the first projection unit 100 and the second projection unit 200 from outside the projector 1. This facilitates the wiring layout and improves the installation of the projector 1. The case 101 and the case 201 may be configured in such a way that the cable 52 is laid inside the coupling part 17 so as not to be exposed outside the projector 1. Also, the cable 52 may be internal wirings of the first projection unit 100 and the second projection unit 200 and coupled together at an electrical coupling part provided in the coupling part 17.

1-5. Configuration of Control System of Projector

Figure 8:
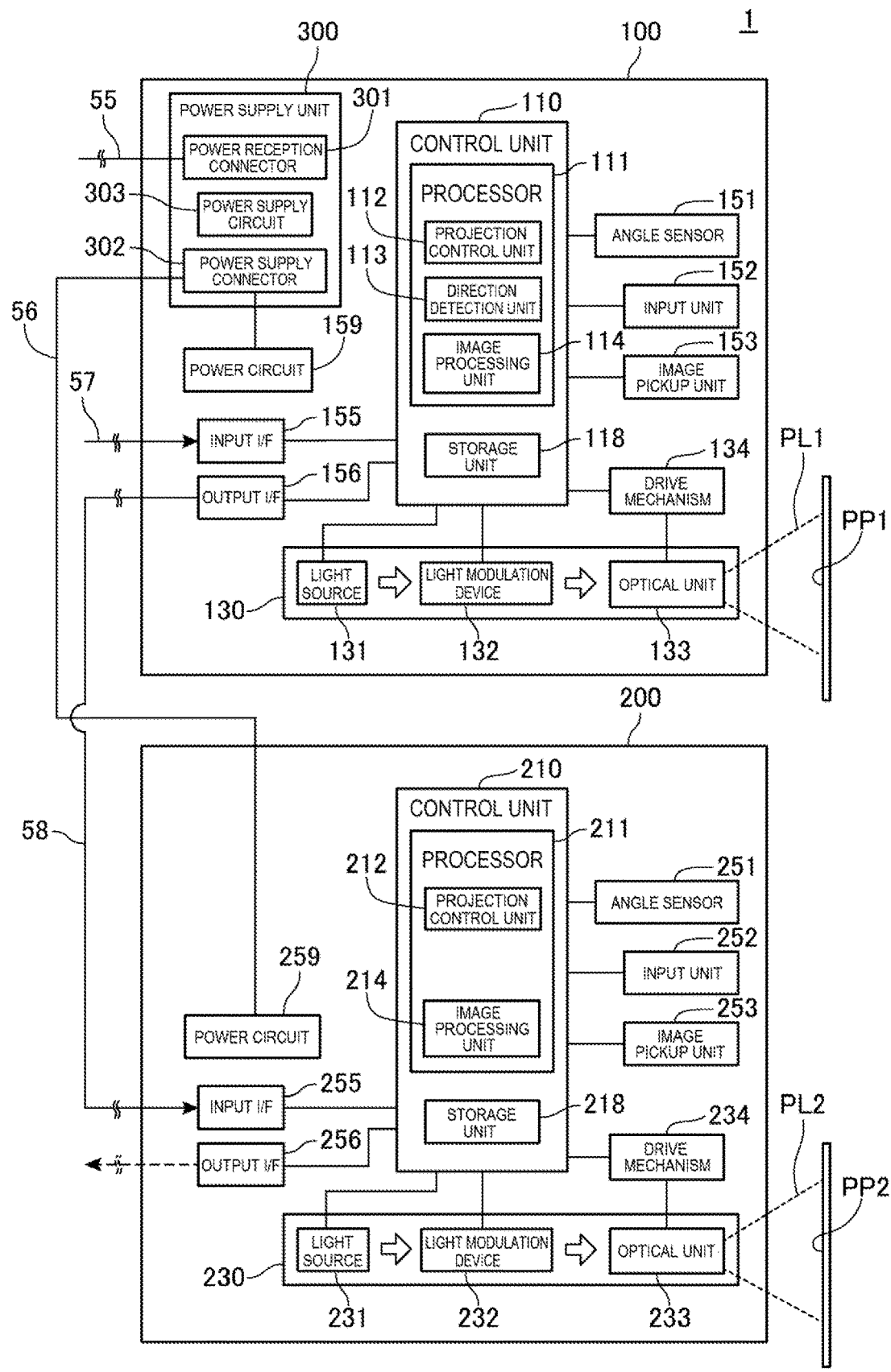
FIG. 8 is a block diagram of the projector.

FIG. 8 is a block diagram of the projector 1.

The first projection unit 100 has a control unit 110 controlling each part of the first projection unit 100. The control unit 110 has, for example, an arithmetic processing device executing a program. The functions of the control unit 110 may be implemented by a collaboration of hardware and software. Alternatively, the control unit 110 may be formed by hardware programmed to implement the arithmetic processing function. In this embodiment, a configuration example of the control unit 110 having a processor 111 which executes a program and a storage unit 118 which stores a program is described. The processor 111 and the storage unit 118 are installed on the control board 105. The processor 111 is an arithmetic processing device made up of a CPU (central processing unit) or a microcomputer or the like. The processor 111 executes a control program stored in the storage unit 118 and thus controls each part of the first projection unit 100.

The storage unit 118 has a non-volatile storage area where the program executed by the processor 111 and data processed by the processor 111 are stored in a non-volatile manner. The storage unit 118 may have a volatile storage area, forming a work area where the program executed by the processor 111 and processing target data are temporarily stored.

The processor 111 may be formed by a single processor or a plurality of processors. The processor 111 may be formed by an SoC (system on chip) integrated with a part or the entirety of the storage unit 118 and/or another circuit. Also, the processor 111 may be formed by a combination of a CPU executing a program and a DSP (digital signal processor) executing predetermined arithmetic processing, as described above. All of the functions of the processor 111 may be installed in hardware or may be configured using a programmable device.

The processor 111 has a projection control unit 112 performing control to project the first image light PL1. The processor 111 has a direction detection unit 113 detecting the direction of projection of the first projection unit 100 in relation to the second projection unit 200. In other words, the direction detection unit 113 detects the relative position between the first projection unit 100 and the second projection unit 200. The processor 111 has an image processing unit 114 executing geometric correction of the first image light PL1.

A part of the projection control unit 112, the direction detection unit 113, and the image processing unit 114 can be formed by different hardware from the processor 111.

The direction detection unit 113 is equivalent to the first angle detection unit according to the disclosure. The projection control unit 112 is equivalent to the first adjustment control unit. The image processing unit 114 is equivalent to the first image processing unit.

The first projection unit 100 has a projection unit 130 forming the first image light PL1.

The projection unit 130 has a light source 131, a light modulation device 132, and an optical unit 133.

The light source 131 is formed by a lamp such as a halogen lamp, xenon lamp, or ultra-high-pressure mercury lamp, or a solid-state light source such as an LED (light-emitting diode) or laser light source. The light source 131 emits light with electric power supplied under the control of the control unit 110. The first projection unit 100 may have a drive circuit supplying electric power to the light source 131 under the control of the control unit 110.

The light modulation device 132 modulates the light emitted from the light source 131, thus generates the first image light PL1, and casts the first image light PL1 onto the optical unit 133.

The light modulation device 132 has, for example, a light modulation element such as a transmission-type liquid crystal light valve, reflection-type liquid crystal light valve, or digital mirror device. The light modulation element of the light modulation device 132 is driven, based on an image signal inputted from the control unit 110, and forms an image on a frame basis. The light modulation device 132 may have a drive circuit driving the light modulation element. For example, when the light modulation device 132 is formed by a liquid crystal light valve, a liquid crystal driver circuit may be provided as a drive circuit.

The optical unit 133 has an optical element such as a lens or mirror to form, on a screen, an image of the light modulated by the light modulation device 132. A drive mechanism 134 moving the optical element of the optical unit 133 and thus adjusting the zoom and focus is coupled to the optical unit 133. The drive mechanism 134 moves the lens group or the like of the optical unit 133 and executes zoom adjustment and focus adjustment of the first image light PL1, under the control of the control unit 110. The drive mechanism 134 functions as a first optical adjustment unit.

As shown in FIG. 8, the first projection unit 100 may have an angle sensor 151, an input unit 152, an image pickup unit 153, an input interface 155, and an output interface 156. Each of these units is coupled to the control unit 110.

The angle sensor 151 detects the relative angle of the first projection unit 100 to the second projection unit 200. The angle sensor 151 may detect the relative angle between one or more of the suspension metal fixtures 11, 12 and the first projection unit 100. The angle sensor 151 is formed, for example, by a geomagnetic sensor or angular velocity sensor.

The input unit 152 accepts an input to the first projection unit 100. For example, when the first projection unit 100 has an operation panel, the input unit 152 detects an operation on this operation panel. When the first projection unit 100 is operable via a remote controller, the input unit 152 is coupled to a reception unit receiving a signal from the remote controller.

The image pickup unit 153 is a device executing image pickup and outputting picked-up image data to the control unit 110. The image pickup unit 153 is, for example, a digital camera module. The image pickup unit 153 picks up an image over an angle of view including the direction of projection in which the projection unit 130 projects the first image light PL1. Therefore, the picked-up image by the image pickup unit 153 includes the projection image PP1 projected by the projection unit 130. The image pickup unit 153 is equivalent to the first image detection unit.

The input interface 155 is an interface to which image data is inputted. The input interface 155 has a connector to which a data transmission cable 57 is coupled, and an interface circuit receiving image data via the data transmission cable 57. The input interface 155 is equivalent to the interface according to the disclosure.

An image supply device supplying image data can be coupled to the input interface 155. As the image supply device, for example, a notebook PC (personal computer), desktop PC, tablet terminal, smartphone, or PDA (personal digital assistant) can be used. The image supply device may be a video player, DVD (digital versatile disk) player, Blu-ray disc player or the like. The image supply device may be a hard disk recorder, television tuner device, CATV (cable television) set-top box, video game machine or the like.

The image data inputted to the input interface 155 may be dynamic image data or still image data and may have an arbitrary data format.

The image data inputted to the input interface 155 is inputted to the control unit 110 and processed by the image processing unit 114. A part of the image data processed by the image processing unit 114 is outputted to the output interface 156.

The output interface 156 is an interface outputting image data. The output interface 156 has a connector to which a data transmission cable 58 is coupled, and an interface circuit transmitting image data via the data transmission cable 58. The specific transmission method of the output interface 156 may be similar to that of the input interface 155. The output interface 156 is coupled to an input interface 255 provided in the second projection unit 200 via the data transmission cable 58.

The input interface 155 and the output interface 156 can be configured in conformity with an image data transmission standard such as HDMI (high-definition multimedia interface). These interfaces may also be configured in conformity with a data communication standard such as Ethernet, IEEE 1394, or USB (universal serial bus). HDMI and Ethernet are registered trademarks. The input interface 155 and the output interface 156 are installed on the input/output board 106. The data transmission cable 57 forms the cable 51.

The first projection unit 100 has a power circuit 159. The power circuit 159 is a circuit supplying electric power to each part of the first projection unit 100 and is coupled to a power supply unit 300, described later. The power circuit 159 may have a distributor distributing a power cable, or may have a voltage converter circuit. The power circuit 159 may include a circuit generating a pulse current or high-voltage current to turn on the light source 131.

The first projection unit 100 has a power supply unit 300. The power supply unit 300 is a circuit coupled to a power cable 55 and supplying electric power to the first projection unit 100 and the second projection unit 200, based on the electric power supplied via the power cable 55. Whether the power supply unit 300 is accommodated in the case 101 or the case 201 does not matter, provided that the projector 1 has the power supply unit 300. In this embodiment, the power supply unit 300 is accommodated in the case 101, along with the components of the first projection unit 100.

The power cable 55 is a cable coupled to a power supply device outside the projector 1 and supplying electric power to the projector 1. The power cable 55 may be a cable coupled to a commercial AC power supply and supplying AC power to the power supply unit 300. The power cable 55 may also be a cable coupled to an AC adaptor, not illustrated, and supplying DC power to the power supply unit 300.

The power supply unit 300 has a power reception connector 301 coupled to the power cable 55, and a power supply connector 302 to which a cable to supply electric power is coupled. The power supply connector 302 is coupled to the power circuit 159 of the first projection unit 100 and to a power supply cable 56 (power cable). The power supply cable 56 is a cable coupled to a power circuit 259 of the second projection unit 200 and supplying electric power to the power circuit 259.

The power supply unit 300 has a circuit generating electric power supplied to the first projection unit 100 and the second projection unit 200, based on the electric power supplied to the power reception connector 301. For example, this circuit is a power circuit including an AC/DC converter, DC/DC converter, and a rectifier circuit or the like. The power reception connector 301 is equivalent to the power reception unit. The power circuit 159 and the power supply unit 300 are installed on the input/output board 106. The power cable 55 forms the cable 51.

The projection control unit 112 selects a projection mode, based on the direction of projection of the first projection unit 100 detected by the direction detection unit 113. When the first projection unit 100 and the second projection unit 200 project in the same direction, the projection control unit 112 selects the split projection mode. The projection control unit 112 generates image data of an image projected by the projection unit 130, based on the image data inputted to the input interface 155. In this embodiment, the control unit 110 processes image data of an image of the second image light PL2 projected by the second projection unit 200. Therefore, the projection control unit 112 generates image data of an image projected by the second projection unit 200, based on the image data inputted to the input interface 155. In the split projection mode, the projection control unit 112 splits the image data inputted to the input interface 155 into two and generates image data adjusted in consideration of the overlapping area PT1.

When the first projection unit 100 and the second projection unit 200 project in different directions, the projection control unit 112 selects the individual projection mode. In the individual projection mode, the projection control unit 112 uses the image data inputted to the input interface 155 as the image data of an image projected by the projection unit 130 and as the image data of an image projected by the second projection unit 200.

The direction detection unit 113 detects the direction of projection of the first projection unit 100. Specifically, the direction detection unit 113 detects whether the direction of projection of the first projection unit 100 is the same as or different from the direction of projection of the second projection unit 200. The direction detection unit 113 may detect whether the direction of projection of the first projection unit 100 is a direction toward the wall surface WA, a direction toward the floor surface FL, or another direction.

The direction detection unit 113 acquires and analyzes picked-up image data from the image pickup unit 153 and detects the direction of projection. The direction detection unit 113 detects, for example, the projection image PP1 projected by the first projection unit 100 and the projection image PP2 from the picked-up image data. When both of the projection image PP1 and the projection image PP2 are detected from the picked-up image data, the direction detection unit 113 determines that the direction of projection of the first projection unit 100 is the same as the direction of projection of the second projection unit 200. When the projection image PP1 is detected and the projection image PP2 is not detected from the picked-up image data, the direction detection unit 113 determines that the direction of projection of the first projection unit 100 is different from the direction of projection of the second projection unit 200.

The direction detection unit 113 may carry out detection, using a detection value from the angle sensor 151.

The direction detection unit 113 may also detect the distance from the projection port 102 to the projection target, based on the picked-up image data from the image pickup unit 153. The projection target is the wall surface WA or the floor surface FL. However, the first projection unit 100 may project onto the ceiling surface LF.

The image processing unit 114 processes image data of an image projected by the projection unit 130 under the control of the projection control unit 112. The image data processed by the image processing unit 114 is the image data generated by the projection control unit 112 so as to be projected by the projection unit 130.

The processing executed by the image processing unit 114 includes geometric correction of the projection image PP1. When the projection image PP1 has a keystone distortion, the image processing unit 114 executes geometric correction to correct the keystone distortion. The image processing unit 114 may execute geometric correction according to a parameter designated by the projection control unit 112. Alternatively, the image processing unit 114 may analyze the picked-up image data from the image pickup unit 153, thus detect the direction and size of the keystone distortion of the projection image PP1, and generate a parameter for geometric correction.

The image processing unit 114 may also carry out image adjustment to adjust the luminance and color tone of the image data. The image processing unit 114 may also carry out resolution conversion to adjust the aspect ratio and resolution of the image data, with the light modulation device 132. The image processing unit 114 may also execute other types of image processing such as frame rate conversion.

The image processing unit 114 generates an image signal based on the image data after the processing including the geometric correction, and outputs the image signal to the light modulation device 132.

The projection control unit 112 causes the light modulation device 132 to operate based on the image signal outputted from the image processing unit 114, and causes the projection unit 130 to project the first image light PL1.

The projection control unit 112 controls the drive mechanism 134 to execute at least one of focus adjustment and zoom adjustment of the optical unit 133. The projection control unit 112 generates a parameter for zoom magnification or focus adjustment, based on the picked-up image data from the image pickup unit 153 or the distance from the projection port 102 to the projection target detected by the direction detection unit 113. The projection control unit 112 controls the drive mechanism 134, based on the generated parameter.

The second projection unit 200 has a control unit 210 controlling each part of the second projection unit 200. The control unit 210 has, for example, an arithmetic processing device executing a program. The functions of the control unit 210 may be implemented by a collaboration of hardware and software. Alternatively, the control unit 210 may be formed by hardware programmed to implement the arithmetic processing function. In this embodiment, a configuration example of the control unit 210 having a processor 211 which executes a program and a storage unit 218 which stores a program is described. The processor 211 and the storage unit 218 are installed on the control board 205. The processor 211 is an arithmetic processing device made up of a CPU or a microcomputer or the like. The processor 211 executes a control program stored in the storage unit 218 and thus controls each part of the second projection unit 200.

The control unit 210 is configured to perform control to project the second image light PL2. The control unit 210 has the processor 211 and the storage unit 218 and has a configuration and functions similar to those of the control unit 110.

The processor 211 has a configuration and functions similar to those of the processor 111. The processor 211 has a projection control unit 212 and an image processing unit 214. A part of the projection control unit 212 and the image processing unit 214 can be formed by different hardware from the processor 211. In this embodiment, the processor 211 does not have a functional unit equivalent to the direction detection unit 113. However, the processor 211 may have a direction detection unit equivalent to the direction detection unit 113. In this case, the processor 211 can detect the direction of projection of the second projection unit 200 in relation to the first projection unit 100.

The projection unit 230 is configured to form the second image light PL2. The projection unit 230 has a light source 231, a light modulation device 232, and an optical unit 233, and has a configuration and functions similar to those of the projection unit 130.

An angle sensor 251, an input unit 252, an image pickup unit 253, an input interface 255, and an output interface 256 have configurations and functions similar to those of the corresponding units of the first projection unit 100.

In this embodiment, the input interface 255 is coupled to the output interface 156 via the data transmission cable 58. The input interface 255 can have specifications corresponding to the output interface 156. Meanwhile, the output interface 256 can be used when the projector 1 has a projection unit other than the first projection unit 100 and the second projection unit 200. The input interface 255 and the output interface 256 are installed on the input/output board 206. The data transmission cable 58 forms the cable 51.

The second projection unit 200 has a power circuit 259. The power circuit 259 is coupled to the power supply unit 300 via the power supply cable 56 and supplies electric power to each part of the second projection unit 200. The power circuit 259 may have a distributor distributing a power cable, or may have a voltage converter circuit. The power circuit 259 may include a circuit generating a pulse current or high-voltage current to turn on the light source 231. In the second projection unit 200, a power supply unit formed similarly to that of the first projection unit 100 may be formed and the power circuit 259 may be coupled to this power supply unit. The power circuit 259 is installed on the input/output board 206. The power supply cable 56 forms the cable 51.

1-6. Operation of Projector

Figure 9:
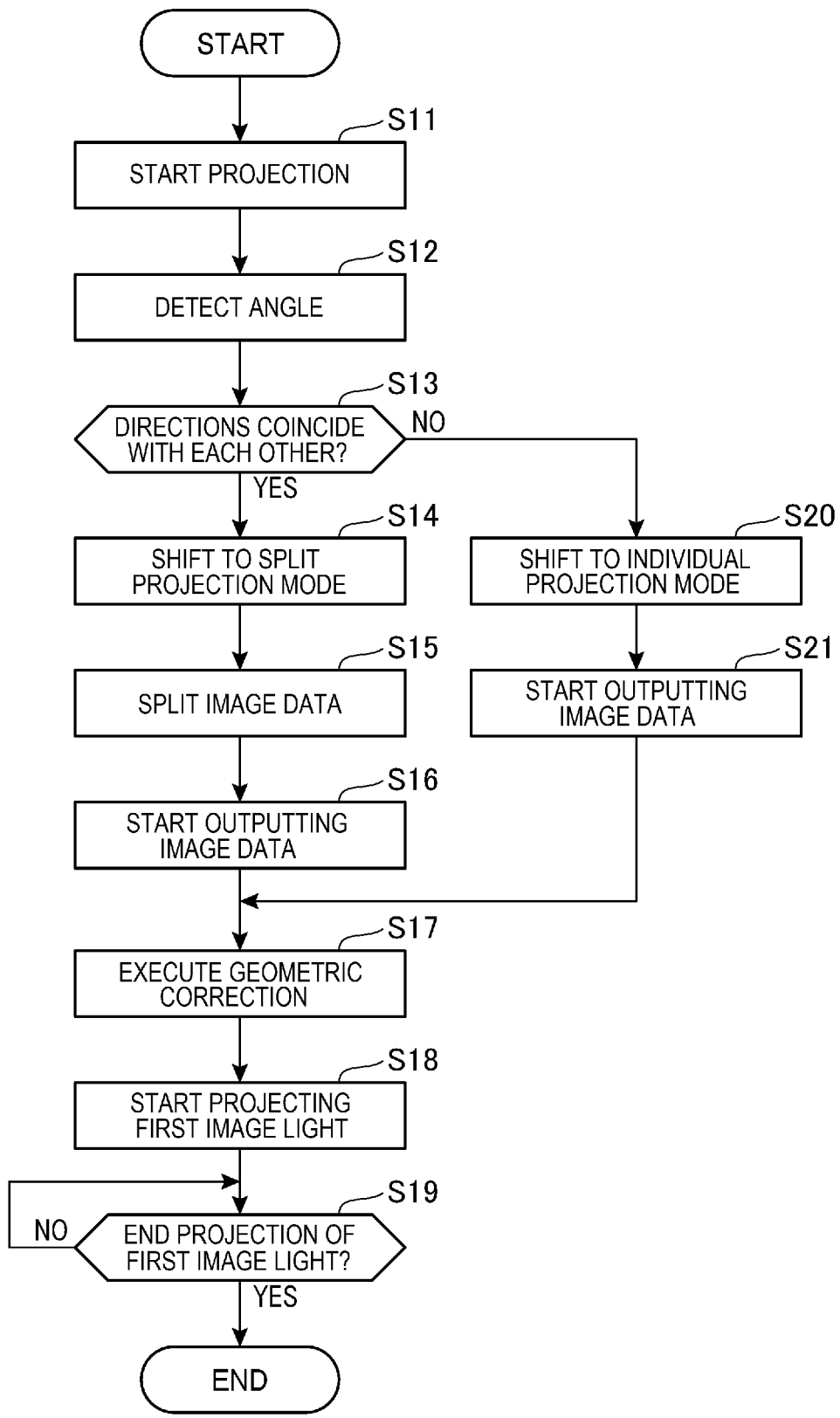
FIG. 9 is a flowchart showing an operation of the projector.
Figure 10:
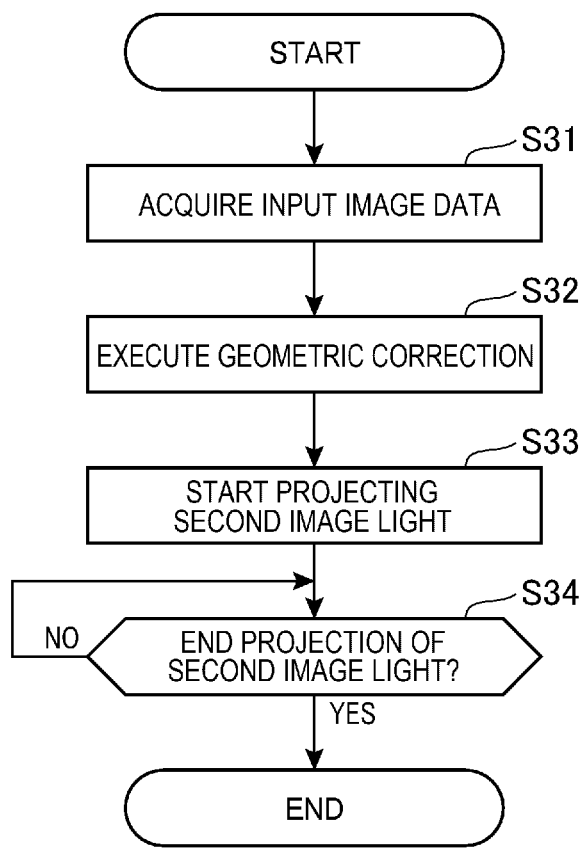
FIG. 10 is a flowchart showing an operation of the projector.

FIGS. 9 and 10 are flowcharts showing an operation of the projector 1. FIG. 9 shows an operation of the first projection unit 100. FIG. 10 shows an operation of the second projection unit 200.

The control unit 110 of the first projection unit 100 starts control on the projection by the projector 1 (step S11) and causes the direction detection unit 113 to detect the angel of the first projection unit 100 (step S12). Based on the result of the detection by the direction detection unit 113, the control unit 110 determines whether the directions of projection of the first projection unit 100 and the second projection unit 200 coincide with each other or not (step S13).

When the directions of projection of the first projection unit 100 and the second projection unit 200 coincide with each other (YES in step S13), the control unit 110 causes the projection control unit 112 to shift to the split projection mode (step S14). The projection control unit 112 splits image data inputted to the input interface 155 and thus generates image data projected by the projection unit 130 and image data outputted to the second projection unit 200 (step S15). The projection control unit 112 starts processing to output the image data generated by the splitting, from the output interface 156 (step S16).

The projection control unit 112 and the image processing unit 114 execute geometric correction of the first image light PL1 projected by the projection unit 130 (step S17). Subsequently, the first projection unit 100 starts projection (step S18). That is, the projection control unit 112 starts projecting the first image light PL1 based on the image data inputted to the input interface 155.

The control unit 110 determines whether a condition to end the projection is met or not (step S19). The condition to end the projection is, for example, that the input unit 152 detects an instruction input to end the projection or that the input of image data to the input interface 155 is stopped. When the condition to end the projection is not met (NO in step S19), the control unit 110 continues the projection. When the condition to end the projection is met (YES in step S19), the control unit 110 ends this processing.

When the directions of projection of the first projection unit 100 and the second projection unit 200 do not coincide with each other (NO in step S13), the control unit 110 causes the projection control unit 112 to shift to the individual projection mode (step S20). The projection control unit 112 uses the image data inputted to the input interface 155 as the image data projected by the projection unit 130 and as the image data outputted to the second projection unit 200, and starts outputting the image data from the output interface 156 (step S21). Subsequently, the projection control unit 112 shifts to step S17.

When the image data is inputted to the input interface 255 from the first projection unit 100, the control unit 210 of the second projection unit 200 acquires the inputted image data (step S31).

The projection control unit 212 and the image processing unit 214 executes geometric correction of the second image light PL2 projected by the projection unit 230 (step S32). Subsequently, the second projection unit 200 starts projection (step S33). That is, the projection control unit 212 starts projecting the second image light PL2 based on the image data inputted to the input interface 255.

The control unit 210 determines whether a condition to end the projection is met or not (step S34). The condition to end the projection is, for example, that the input unit 252 detects an instruction input to end the projection or that the input of image data to the input interface 255 is stopped. When the condition to end the projection is not met (NO in step S34), the control unit 210 continues the projection. When the condition to end the projection is met (YES in step S34), the control unit 210 ends this processing.

As described above, the projector 1 according to the embodiment has the first projection unit 100 projecting the first image light PL1, and the second projection unit 200 projecting the second image light PL2. The projector 1 has the coupling part 17 coupling the first projection unit 100 and the second projection unit 200 together. The first projection unit 100 is configured to pivot about the first axis AX1 in relation to the second projection unit 200 and projects the first image light PL1 in a direction intersecting the first axis AX1. The second projection unit 200 is configured to pivot about the second axis AX2 in relation to the first projection unit 100 and projects the second image light PL2 in a direction intersecting the second axis AX2. The coupling part 17 couples the first projection unit 100 and the second projection unit 200 together in such a way that the first axis AX1 and the second axis AX2 are arranged on a coaxial line.

The first projection unit 100 and the second projection unit 200 are coupled together via the external cable 52. Each projection unit forms one projector. The entirety of these projection units forms the projection system 10. The first projection unit 100 is configured to pivot about the first axis AX1 in relation to the second projection unit 200 and projects the first image light PL1 in a direction intersecting the first axis AX1. The second projection unit 200 is configured to pivot about the second axis AX2 in relation to the first projection unit 100 and projects the second image light PL2 in a direction intersecting the second axis AX2.

In the projector 1 and the projection system 10 to which the disclosure is applied, the direction of projection of the projection image PP1 and the direction of projection of the projection image PP2 are allowed to pivot. The first projection unit 100 and the second projection unit 200 are allowed to pivot about the same axis, thus changing the direction of projection of the projection image PP1 and the direction of projection of the projection image PP2. This can provide a structure that makes the direction of projection of a plurality of projection light beams variable. Thus, various projection forms can be implemented such as the projector 1 projecting the projection image PP1 and the projection image PP2 next to each other or projecting these projection images on different surfaces.

In the projector 1, the first projection unit 100 and the second projection unit 200 are configured to pivot independently of each other. The first projection unit 100 projects the first image light PL1 in a direction orthogonal to the first axis AX1. The second projection unit 200 projects the second image light PL2 in a direction orthogonal to the second axis AX2.

Therefore, the projector 1 projects the first image light PL1 and the second image light PL2 in a direction orthogonal to a common axis. Thus, the direction of projection of the projection image PP1 by the first projection unit 100 and the direction of projection of the projection image PP2 by the second projection unit 200 can be changed independently of each other and the direction of projection of the first image light PL1 and the second image light PL2 can be changed about the axis. Also, the state where the first image light PL1 and the second image light PL2 are projected next to each other can be easily created.

The projector 1 has the power supply unit 300 which has the power reception connector 301 receiving electric power supply and which supplies the electric power supplied to the power reception connector 301, to the first projection unit 100 and the second projection unit 200. Thus, the electric power supplied from outside the projector 1 via the power cable 55 can make both of the first projection unit 100 and the second projection unit 200 to operate. Therefore, the power cable 55 alone is enough to supply a power source to the projector 1. This can facilitate the cable layout and improve the design.

The first projection unit 100 projects the first image light PL1 based on image data inputted to the input interface 155. The second projection unit 200 projects the second image light PL2 based on the image data inputted to the input interface 155. Thus, inputting image data from outside the projector 1 via the data transmission cable 57 enables the first projection unit 100 and the second projection unit 200 to project an image. Therefore, the data transmission cable 57 alone is enough to supply image data to the projector 1. This can facilitate the cable layout and improve the design.

The power supply cable 56 supplying electric power from the power supply unit 300 to the second projection unit 200 may be arranged from inside the case 101 to inside the case 201 through the coupling part 17. Similarly, the data transmission cable 58 may be arranged from inside the case 101 to inside the case 201 through the coupling part 17. In this case, the cable exposed outside the projector 1 is reduced. This can further facilitate the cable layout and further improve the design.

The first projection unit 100 has the direction detection unit 113 detecting an angle around the first axis AX1 of the first projection unit 100, and the image processing unit 114 executing geometric correction based on the angle detected by the direction detection unit 113. Since geometric correction is carried out corresponding to the direction in which the first projection unit 100 projects the projection image PP1, the projection image PP1 of high definition can be projected regardless of the direction of projection.

The first projection unit 100 has the image pickup unit 153 detecting the projection image PP1 formed by the first image light PL1, and the drive mechanism 134 adjusting at least one of zoom and focus of the first image light PL1. The first projection unit 100 has the projection control unit 112 causing the drive mechanism 134 to adjust at least one of zoom and focus of the first image light PL1, based on a picked-up image from the image pickup unit 153. Thus, the first projection unit 100 can detect the state of the first image light PL1, based on the picked-up image from the image pickup unit 153, and perform zoom adjustment or focus adjustment. Therefore, the projection image PP1 of high definition can be projected regardless of the direction of projection.

In the projector 1, the first projection unit 100 and the second projection unit 200 coupled together by the coupling part 17 are coupled to the suspension metal fixtures 11, 12 provided at the installation position.

The projector 1 has a support part coupled to the suspension metal fixtures 11, 12. The support part is the protrusion 32 or the recess 43 coupled to the suspension metal fixture 11 at the support part 15, and the protrusion 37 or the protrusion 47 coupled to the suspension metal fixture 12 at the support part 16. The suspension metal fixtures 11, 12 are fixtures fixed to the ceiling surface LF of the installation room RM and suspending and supporting the projector 1. This configuration enables the projector 1 to be fixed to the ceiling surface LF in such a way that the first projection unit 100 and the second projection unit 200 can pivot.

The projector 1 is configured to switch between and execute the split projection mode and the individual projection mode. In the split projection mode, the first projection unit 100 and the second projection unit 200 respectively project a split image split from one image. In the individual projection mode, the first projection unit 100 and the second projection unit 200 respectively project one whole image.

The projector 1 switches between the split projection mode and the individual projection mode according to the relative angle between the first projection unit 100 and the second projection unit 200.

Thus, inputted image data can be properly projected, corresponding to the projection state of the first projection unit 100 and the second projection unit 200. That is, in the state where the projection image PP1 and the projection image PP2 are next to each other, the projection image PP1 and the projection image PP2 can be connected together to project one large image. Meanwhile, when the projection image PP1 and the projection image PP2 are projected in different directions, the same image can projected in each direction. Thus, the projector 1 configured to easily change the direction of projection of a plurality of image light beams can switch between the projection modes according to the direction of projection, thus achieving a high visual effect.

2. Second Embodiment

Figure 11:
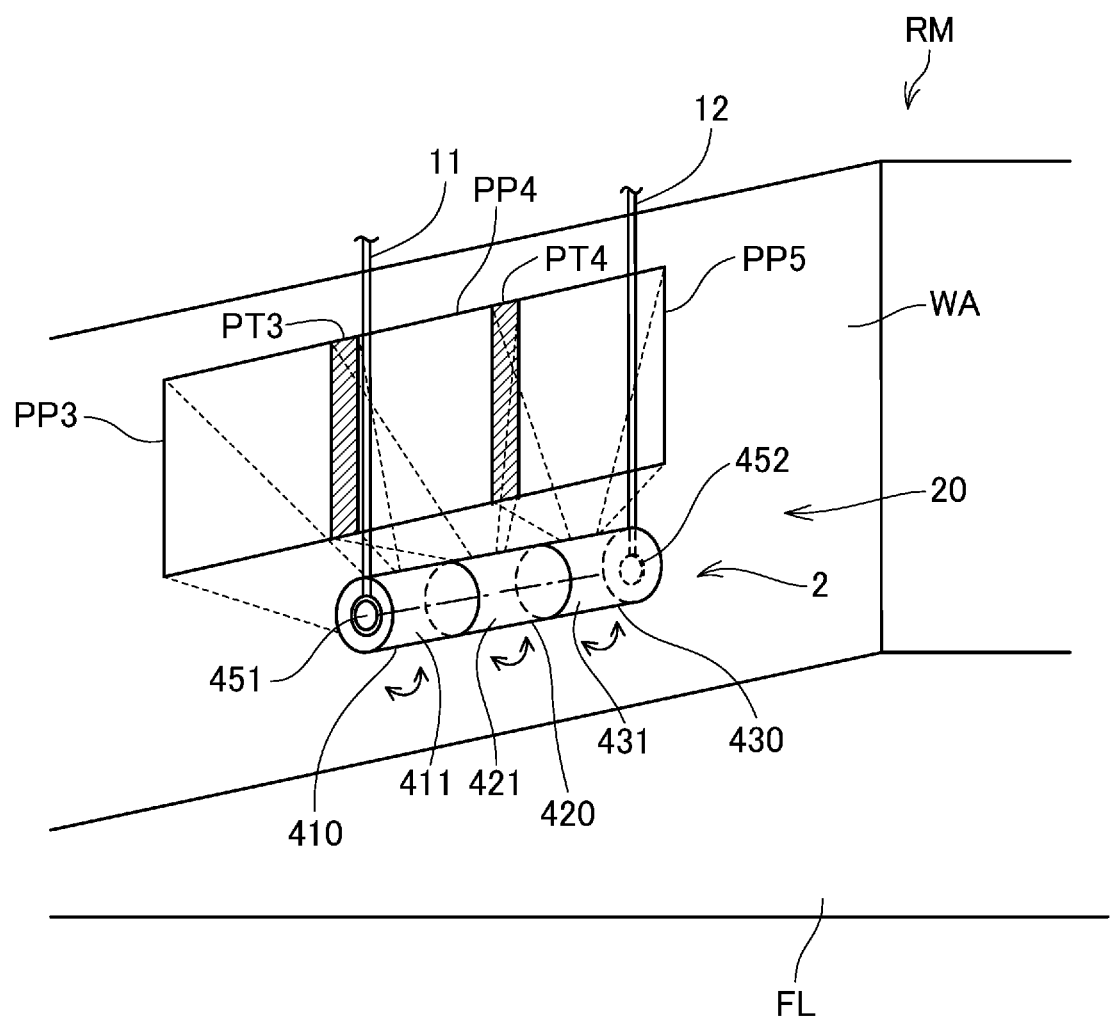
FIG. 11 is a perspective view of a projector according to a second embodiment.
Figure 12:
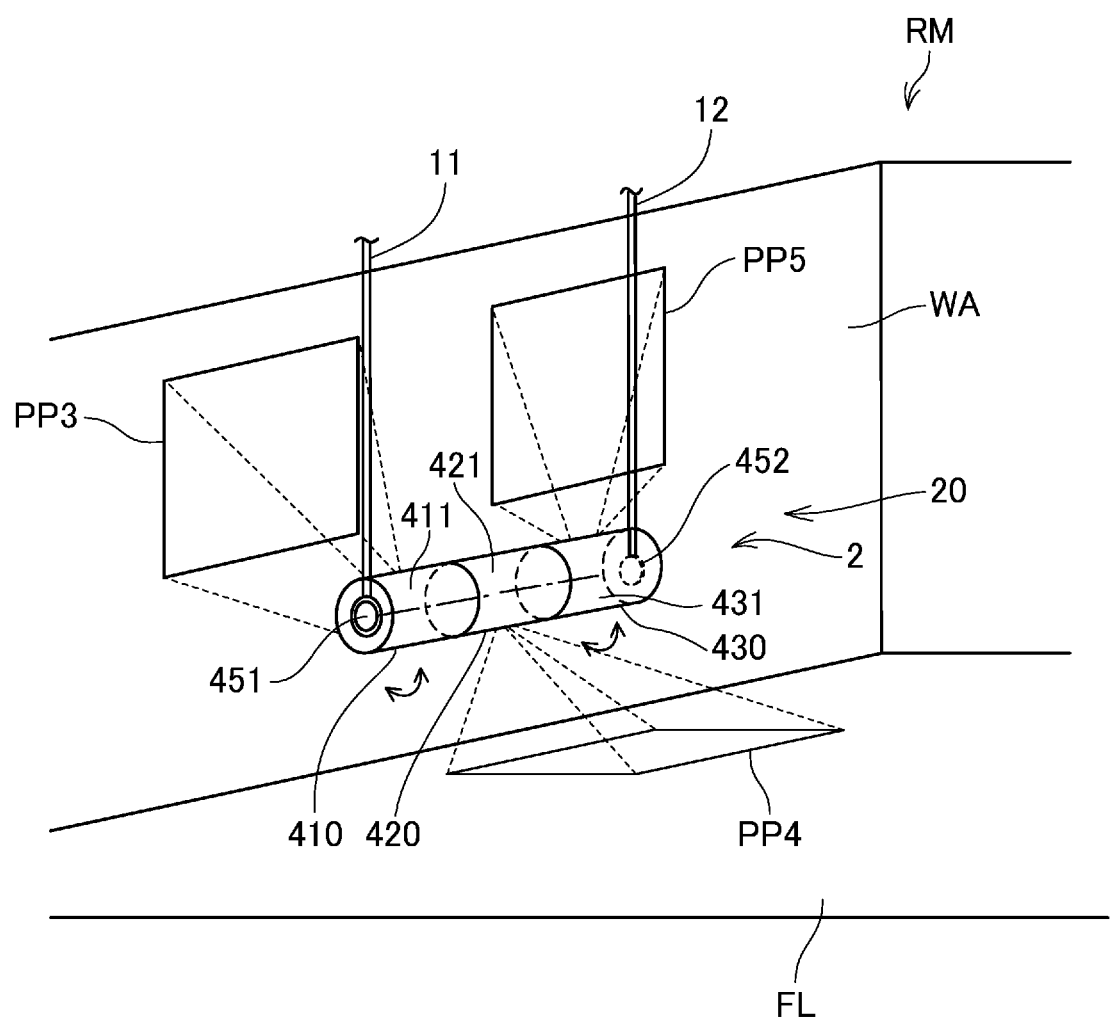
FIG. 12 is a perspective view of the projector.

FIGS. 11 and 12 are perspective views showing a schematic configuration of a projector 2 according to a second embodiment to which the disclosure is applied. FIGS. 11 and 12 show a projection system 20 including the projector 2.

An installation room RM where the projector 2 is installed, and a wall surface WA and a floor surface FL as projection targets are similar to those in the first embodiment. The projector 2 is fixed to suspension metal fixtures 11, 12. The suspension metal fixtures 11, 12 are configured similarly to those in the first embodiment and fixed to a ceiling surface LF. The same components as in the first embodiment are denoted by the same reference signs and not described further in detail.

The projector 2 is made up of a first projection unit 410, a second projection unit 420, and a third projection unit 430 coupled together. The first projection unit 410 has a cylindrical case 411. The second projection unit 420 has a cylindrical case 421. The third projection unit 430 has a cylindrical case 431. The cases 411, 421, 431 are coupled together in such a way that the center axes of the cases are arranged on a coaxial line. A support part 451 is formed in the case 411. The support part 451 is coupled to the suspension metal fixture 11. A support part 452 is formed in the case 431. The support part 452 is coupled to the suspension metal fixture 12.

In the projector 2, the cases 411, 421, 431 can rotate independently of each other in the state where the projector 2 is coupled to the suspension metal fixtures 11, 12 via the support parts 451, 452.

The first projection unit 410 can be configured having a control unit 110, a projection unit 130, and a power supply unit 300, similarly to the first projection unit 100, and projects a projection image PP3 via the projection unit 130. The second projection unit 420 and the third projection unit 430 can be configured, having a control unit 210 and a projection unit 230, similarly to the second projection unit 200. The second projection unit 420 projects a projection image PP4. The third projection unit 430 projects a projection image PP5.

In the first embodiment, the projector 1 has the first projection unit 100 and the second projection unit 200 coupled together, as two projection units. The projector 2 in the second embodiment has three projection units, that is, the first projection unit 410, the second projection unit 420, and the third projection unit 430.

In the projector 2, all of the first projection unit 410, the second projection unit 420, and the third projection unit 430 can project an image on the wall surface WA, for example, as shown in FIG. 11. In this case, the projection images PP3, PP4, PP5 are projected next to each other on the wall surface WA. Forming an overlapping area PT3 at the boundary between the projection image PP3 and the projection image PP4 and an overlapping area PT4 at the boundary between the projection image PP4 and the projection image PP5 enables projection of a single wide image on the wall surface WA. The operation of the projector 2 in this case is similar to the split projection mode of the projector 1.

In the projector 2, the direction of projection of one of the first projection unit 410, the second projection unit 420, and the third projection unit 430 can be made different from that of the other projection units, for example, as shown in FIG. 12. In the example of FIG. 12, the projection images PP3, PP5 are projected on the wall surface WA and the projection image PP4 is projected on the floor surface FL.

In the example of FIG. 12, preferably, the projection images PP3, PP4, PP5 are projected respectively as the same whole image. The operation of the projector 2 in this case is similar to the individual projection mode of the projector 1.

In this way, the projector and the projection system according to the disclosure can also be applied to a configuration having three projection units. For example, in the projector 2, the directions of projection of the first projection unit 410 and the third projection unit 430 can be made different. The first projection unit 410 may project the projection image PP3 on the ceiling surface LF.

All of the first projection unit 410, the second projection unit 420, and the third projection unit 430 have the cylindrical cases 411, 421, 431. The shape of the cases 411, 421, 431 and the outer shape of the projection units are arbitrary and may be substantially box-shaped as in the first embodiment or may be another shape. Employing a cylindrical shape like the cases 411, 421, 431 and making the center axis of the cases coincident with the rotation axis is preferable as an interior item because the appearance of the projector 2 does not largely change even when the direction of projection is changed.

The foregoing embodiments are simply specific examples to which the disclosure is applied, and should not limit the disclosure. The disclosure can also be applied in different forms.

For example, while an example where the projector 1, 2 is fixed to the suspension metal fixtures 11, 12 suspended from the ceiling surface LF is described in the foregoing embodiments, the disclosure is not limited to this. For example, the suspension metal fixtures 11, 12 may be fixed to the wall surface WA or may be metal fixtures fixed to the floor surface FL. Also, a wire or rope suspended from the ceiling surface LF may be used instead of the suspension metal fixtures 11, 12. Moreover, one end in the longitudinal direction of the projector 1, 2 may be supported like a cantilever by a fixture such as the suspension metal fixture 11 or the suspension metal fixture 12.

In the embodiments, an example where the image data inputted via the data transmission cable 57 is data of one image and where the input image data is split in the split projection mode whereas the input image data is projected as it is in the individual projection mode, is described. For example, a configuration where image data of a plurality of images is superimposed together and transmitted to the first projection unit 100 via the data transmission cable 57 may be employed. In this case, the processor 111 acquires the image data of the plurality of images from the input interface 155. The processor 111 may cause the first projection unit 100 and the second projection unit 200 to project different images from each other in the individual projection mode. The same applies to the projector 2.

Also, as the projector 1 in the embodiment, for example, a configuration where the input interfaces 155, 255 and the output interface 156 input and output image data via the data transmission cables 57, 58 is described. The disclosure is not limited to this. The input interfaces 155, 255 and the output interface 156 may be configured of a wireless communication module. In this case, image data can be transmitted via wireless communication. Therefore, the data transmission cables 57, 58 are not needed.

The projector 1 in the embodiment is configured to project a projection image on the wall surface WA or the floor surface FL of the installation room RM as the projection target. However, a curtain or plate member may be installed in the installation room RM and the curtain or plate member may be used as the projection target.

At least a part of the functional blocks shown in FIG. 8 may be implemented by hardware or may be implemented by a collaboration of hardware and software and is not limited to a configuration where independent hardware resources are arranged as illustrated in the drawing. The program executed by the processors 111, 211 is not limited to being stored in the storage units 118, 218 and may be stored in a storage device formed separately from the projector 1. The processors 111, 211 may acquires and execute a program stored in an external device. Also, the projection system 10 may have a plurality of projectors 1. In this case, the plurality of projectors 1 may project a projection image on a common projection target or may project a projection image on different projection targets from each other.

The specific detailed configuration of each of the other parts forming the projection system 10 and the projector 1 can be changed arbitrarily without departing from the spirit and scope of the disclosure.

What is claimed is:

1. A projector comprising:
a first projector projecting first image light;
a second projector projecting second image light; and
a coupling structure coupling the first projector and the second projector together, wherein
the first projector is configured to pivot about a first axis in relation to the second projector and projects the first image light in a direction intersecting the first axis,
the second projector is configured to pivot about a second axis in relation to the first projector and projects the second image light in a direction intersecting the second axis, and
the coupling structure couples the first projector and the second projector together in such a way that the first axis and the second axis are arranged on a coaxial line,
wherein the first projector and the second projector are configured to execute a split projection mode in which the first projector and the second projector respectively project a split image split from one image, and the split images are partially overlapped with each other.

2. The projector according to claim 1, wherein
the first projector and the second projector are configured to pivot independently of each other, and
the first projector projects the first image light in a direction orthogonal to the first axis, and the second projector projects the second image light in a direction orthogonal to the second axis.

3. The projector according to claim 1, further comprising a power supply unit which has a power reception unit receiving electric power supply and which supplies the electric power supplied to the power reception unit, to the first projector and the second projector.

4. The projector according to claim 1, wherein
the first projector projects the first image light, based on image data inputted to an interface, and
the second projector projects the second image light, based on the image data inputted to the interface.

5. The projector according to claim 1, wherein
the first projector comprises:
a first angle detection unit detecting an angle around the first axis of the first projector; and
a first image processing unit executing geometric correction based on the angle detected by the first angle detection unit.

6. The projector according to claim 1, wherein
the first projector comprises:
a first image detection unit detecting a first projection image formed by the first image light;
a first optical adjustment unit adjusting at least one of zoom and focus of the first image light; and
a first adjustment control unit causing the first optical adjustment unit to execute adjustment, based on a result of the detection by the first image detection unit.

7. The projector according to claim 1, wherein
the first projector and the second projector coupled together by the coupling structure are coupled to a fixture provided at an installation position, and
the projector comprises a support part coupled to the fixture which is fixed to a ceiling of an installation room where the projector is installed and which suspends and supports the projector.

8. The projector according to claim 1, wherein
the first projector and the second projector are configured to switch between and execute the split projection mode and an individual projection mode in which the first projector and the second projector respectively project an entirety of the image, and
the split projection mode and the individual projection mode are switched according to a relative angle between the first projector and the second projector.

9. A projection system comprising a first projector, a second projector, and a coupling structure coupling the first projector and the second projector together, wherein
the first projector is configured to pivot about a first axis in relation to the second projector and projects first image light in a direction intersecting the first axis,
the second projector is configured to pivot about a second axis in relation to the first projector and projects second image light in a direction intersecting the second axis, and
the coupling structure couples the first projector and the second projector together in such a way that the first axis and the second axis are arranged on a coaxial line, and
the first projector and the second projector are configured to execute a split projection mode in which the first projector and the second projector respectively project a split image split from one image, and the split images are partially overlapped with each other.

* * * * *